United States Patent
Yabe

(10) Patent No.: US 7,944,583 B2
(45) Date of Patent: May 17, 2011

(54) IMAGE PROCESSING APPARATUS AND METHOD

(75) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 11/776,586

(22) Filed: Jul. 12, 2007

(65) Prior Publication Data
US 2008/0024844 A1    Jan. 31, 2008

(30) Foreign Application Priority Data

Jul. 28, 2006  (JP) ................................. 2006-207164

(51) Int. Cl.
*H04N 1/00* (2006.01)
*H04N 1/46* (2006.01)
*G06K 15/00* (2006.01)
*G06K 9/00* (2006.01)
*G03F 3/10* (2006.01)

(52) U.S. Cl. .......... 358/1.6; 358/1.9; 358/504; 358/518; 382/167

(58) Field of Classification Search ........................ None
See application file for complete search history.

(56) References Cited

U.S. PATENT DOCUMENTS

| 7,298,527 | B2 | 11/2007 | Yabe | 358/1.9 |
| 2005/0259280 | A1* | 11/2005 | Rozzi | 358/1.9 |
| 2005/0270587 | A1* | 12/2005 | Yamakawa et al. | 358/448 |
| 2007/0109565 | A1* | 5/2007 | Presley et al. | 358/1.9 |
| 2010/0265524 | A1* | 10/2010 | Muramatsu | 358/1.9 |

* cited by examiner

*Primary Examiner* — Twyler L Haskins
*Assistant Examiner* — Barbara D Reinier
(74) *Attorney, Agent, or Firm* — Fitzpatrick, Cella, Harper & Scinto

(57) ABSTRACT

The type of profile used in color processing is determined and a calibration method of correcting color reproducibility of an output device is set selectively in accordance with the type of profile determined. In determining the profile type, it is determined whether the profile is a device-link profile.

4 Claims, 10 Drawing Sheets

IMAGE PROCESSING APPARATUS AND METHOD

BACKGROUND OF THE INVENTION

1. Field of the Invention

The present invention relates to color processing utilizing a profile. More particularly, the invention relates to a technique for executing calibration processing suited to a profile.

2. Description of the Related Art

In color processing (color management processing) utilizing a color profile, the general practice presently is to perform calibration as a correction for a change in the engine characteristics of a printer.

The flow of processing using an ordinary color profile will be described with reference to FIG. 1, by way of example. As shown in FIG. 1, input data 101 of CMYK values (C1, M1, Y1, K1) is converted to color-space data 103 in $L^*a^*b^*$ color space by performing a conversion using a source color profile 102. This $L^*a^*b^*$ color space is a device-independent color space with respect to input CMYK values. The color-space data 103 is converted to output data 105 of CMYK values (C2, M2, Y2, K2) by performing a conversion using a destination color profile 104. The destination color profile 104 contains combinations of CMYK values of an output device with respect to the color-space data 103.

The output data 105 is converted to data 106 of CMYK values (C2', M2', Y2', K2') by a calibration unit that corrects for a change in the tone characteristics of the engine. Here C2, M2, Y2 and K2 are converted to C2', M2', Y2' and K2', respectively, by one-dimensional LUTs (Look-Up Tables) 107, 108, 109 and 110, respectively.

Next, the flow of processing using a device-link profile that has recently come into circulation will be described with reference to FIG. 2. The device-link profile is a profile incorporating a correspondence table of correspondence from input values to output values created by finding the correspondence of output values from input values using color management on the basis of a profile for input and a profile for output. A color-space conversion from input values to output values can be performed using this profile alone.

The input data 101 shown in FIG. 2 is converted directly to output data 202 of CMYK values (C3, M3, Y3, K3) by a device-link profile 201. In a manner similar to that of FIG. 1, the output data 202 obtained by the conversion is converted to data 203 of CMYK values (C3', M3', Y3', K3') by a calibration unit that corrects for a change in the tone characteristics of the engine. That is, C3, M3, Y3 and K3 are converted to C3', M3', Y3' and K3', respectively, by one-dimensional LUTs 107, 108, 109 and 110, respectively.

The difference between the ordinary color profile and device-link profile will be described with reference to FIGS. 3 and 4. FIG. 3 is a diagram useful in describing color processing using the ordinary color profile, and FIG. 4 is a diagram useful in describing color processing using the device-link profile.

In the case of the ordinary color profile, the combination of CMYK at 301 in FIG. 3 differs from the combination of CMYK at 302. However, the color-space data obtained by the conversion using the source color profile 102 takes on the same values ($L^*=5$, $a^*=b^*=0$) 303 in both cases. If black of the same color-space data 303 is converted by the destination color profile 104, output data 304 of CMYK values (C3, M3, Y3, K3) is obtained. That is, in a case where values 301 and 302 having different input CMYK values indicate the same Lab values, the output CMYK values will be the same. On the other hand, the device-link profile is capable of making the output data correspond to input data of different CMYK values.

As illustrated in FIG. 4, the device-link profile converts CMYK values of the input data directly to CMYK values of the output data. It is possible, therefore, for separate output CMYK values to be correlated with the input data 301 and input data 302 (i.e., for the input data 301 and the input data 302 to be handled separately). The chief feature is that if the input data differs, a conversion can be made in such a manner that the output data also will differ.

More specifically, with processing according to the ordinary color profile, the output with respect to black involves the same combination of CMYK. With the device-link profile, however, a difference in CMYK values in input data can be reflected directly in a difference in CMYK values in output data.

Recently, however, in order to raise the accuracy of calibration, C, M, Y, K are not corrected by respective one-dimensional LUTs. Rather, as illustrated in FIG. 5, an arrangement in which a correction is applied using a multi-dimensional LUT 503 has begun to be employed. With a one-dimensional LUT, what is reproduced solely with Y (yellow) before calibration is Y only even after calibration is performed; only Y is calibrated, and there is no change whatsoever in CMK.

As illustrated in FIG. 5, the multi-dimensional LUT 503 is capable of defining CMYK-to-CMYK. Therefore, output data can be converted to a combination of CMYK even with respect to Y-only input data. As a result, in this case the combination of colors cannot be assured, but the accuracy of color reproduction can be improved in comparison with the case where one-dimensional LUTs are used.

Nevertheless, a drawback is that even if a conversion is made to yellow-only data 601 using the device-link profile 201, as illustrated in FIG. 6, there is a possibility that as a result of the conversion by the multi-dimensional LUT 603, a color other than Y will mix in with data 602 after calibration.

It might not be hoped that a color mixes from accuracy of color reproduction as the type of an image and hope of a user.

SUMMARY OF THE INVENTION

The present invention realizes to set a method of calibration selectively in accordance with the type of profile.

Furthermore, the present invention realizes to make it possible to select a method of calibration and to make it possible to select whether to seek accuracy of color reproduction or a combination of output values.

According to one aspect of the present invention, there is provided an image processing apparatus comprising a determination unit adapted to determine a type of a profile used in color processing, and a setting unit adapted to selectively set a method of calibration, which corrects the color reproducibility of an output device, in accordance with the type of profile determined by the determination unit.

According to another aspect of the present invention, there is provided an image processing method comprising determining a type of a profile used in color processing, and selectively setting a method of calibration, which corrects color reproducibility of an output device, in accordance with the type of profile determined in the determining step.

Further features of the present invention will become apparent from the following description of exemplary embodiments (with reference to the attached drawings).

DESCRIPTION OF THE EMBODIMENTS

Preferred embodiments of the present invention will now be described in detail with reference to the drawings.

First Embodiment

Figure 1:
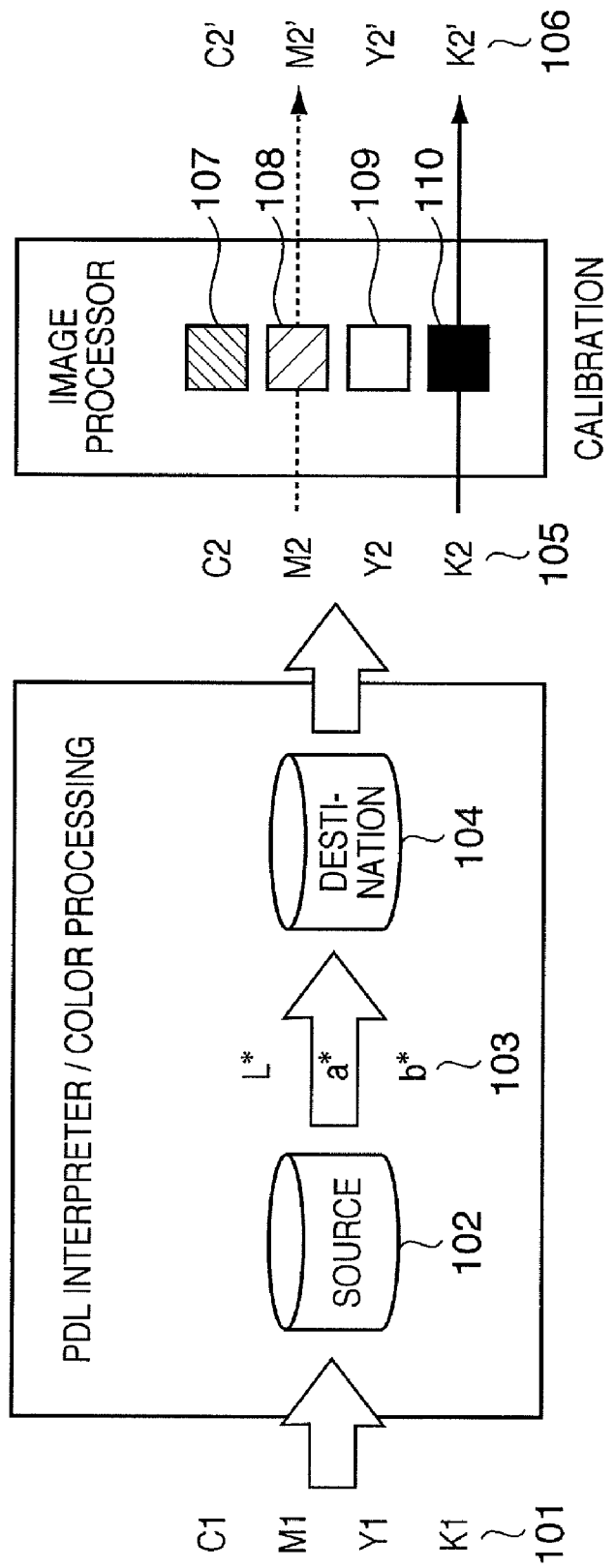
FIG. 1 is a diagram useful in describing the flow of processing according to an ordinary color profile.
Figure 2:
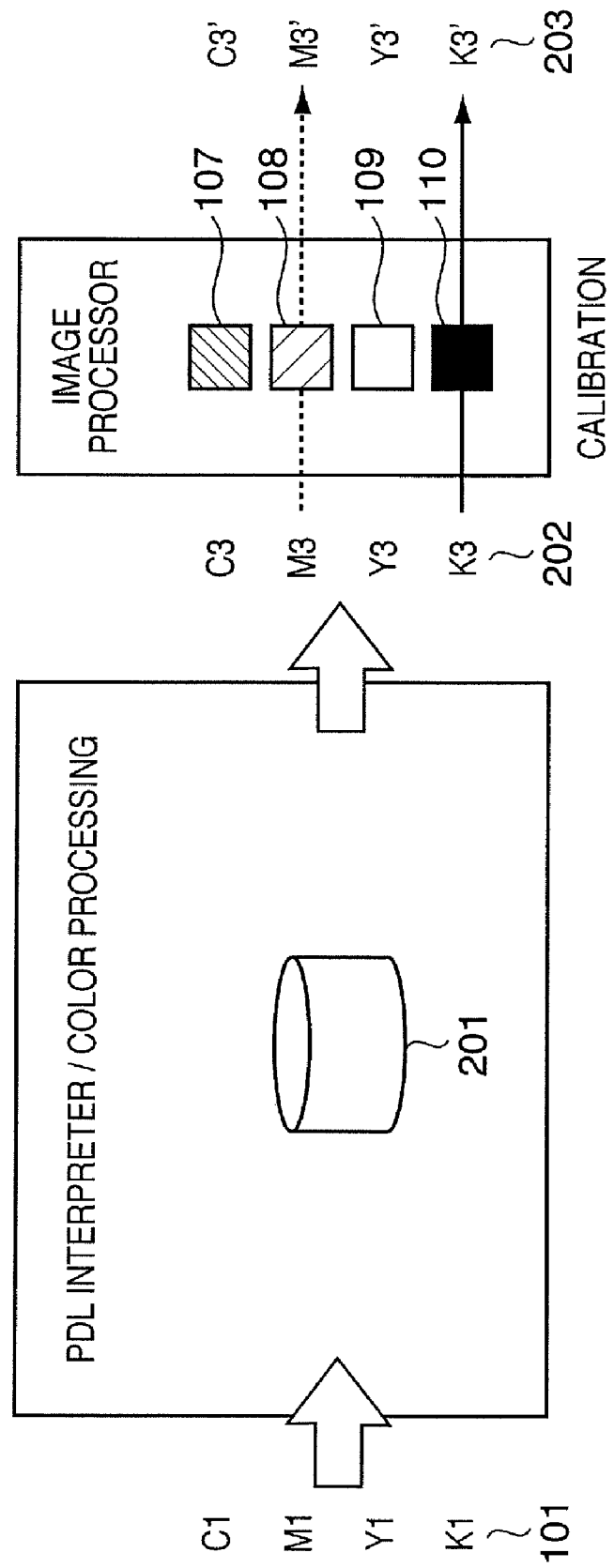
FIG. 2 is a diagram useful in describing the flow of processing according to a device-link profile.
Figure 3:
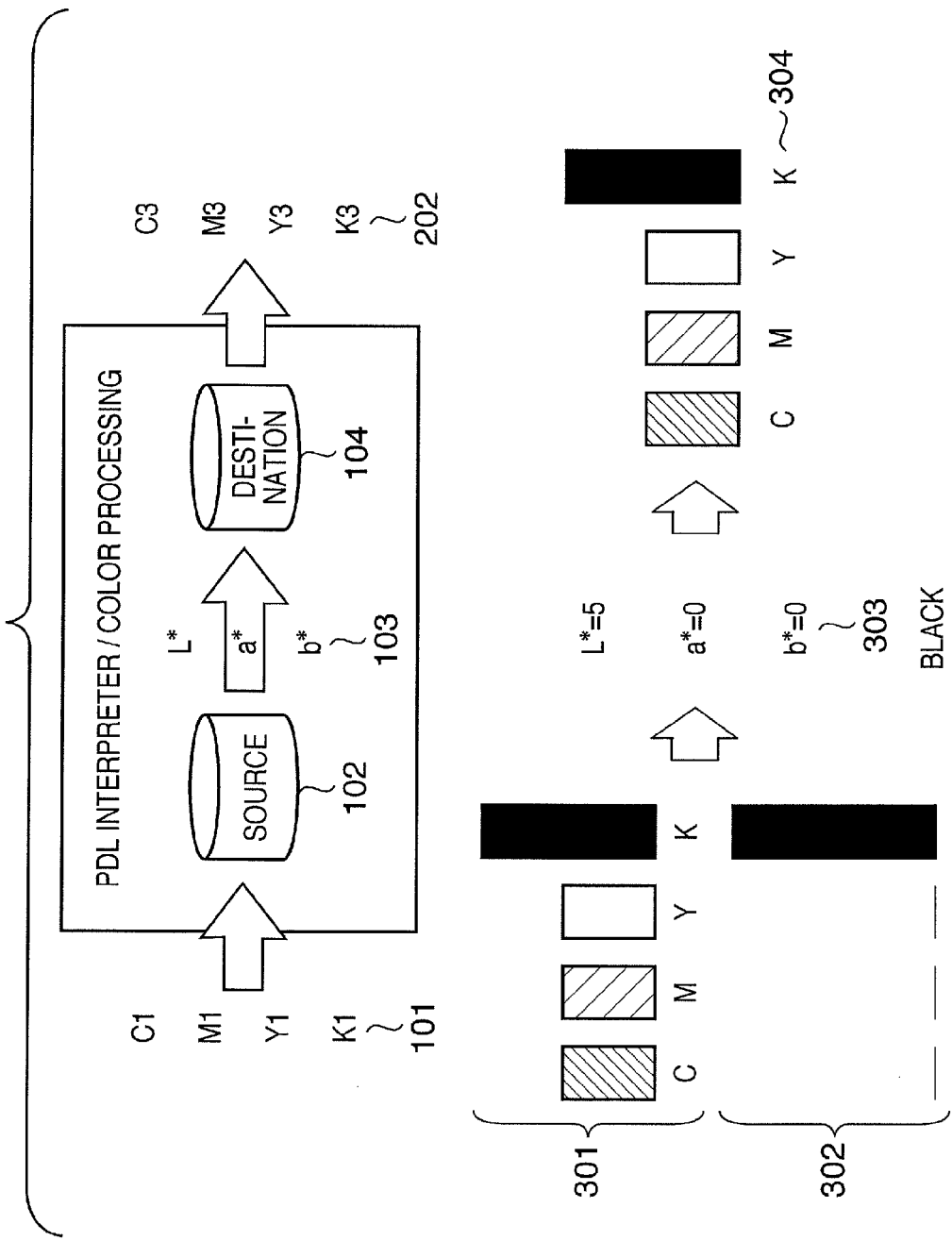
FIG. 3 is a diagram illustrating processing for converting input data to output data using an ordinary color profile.
Figure 4:
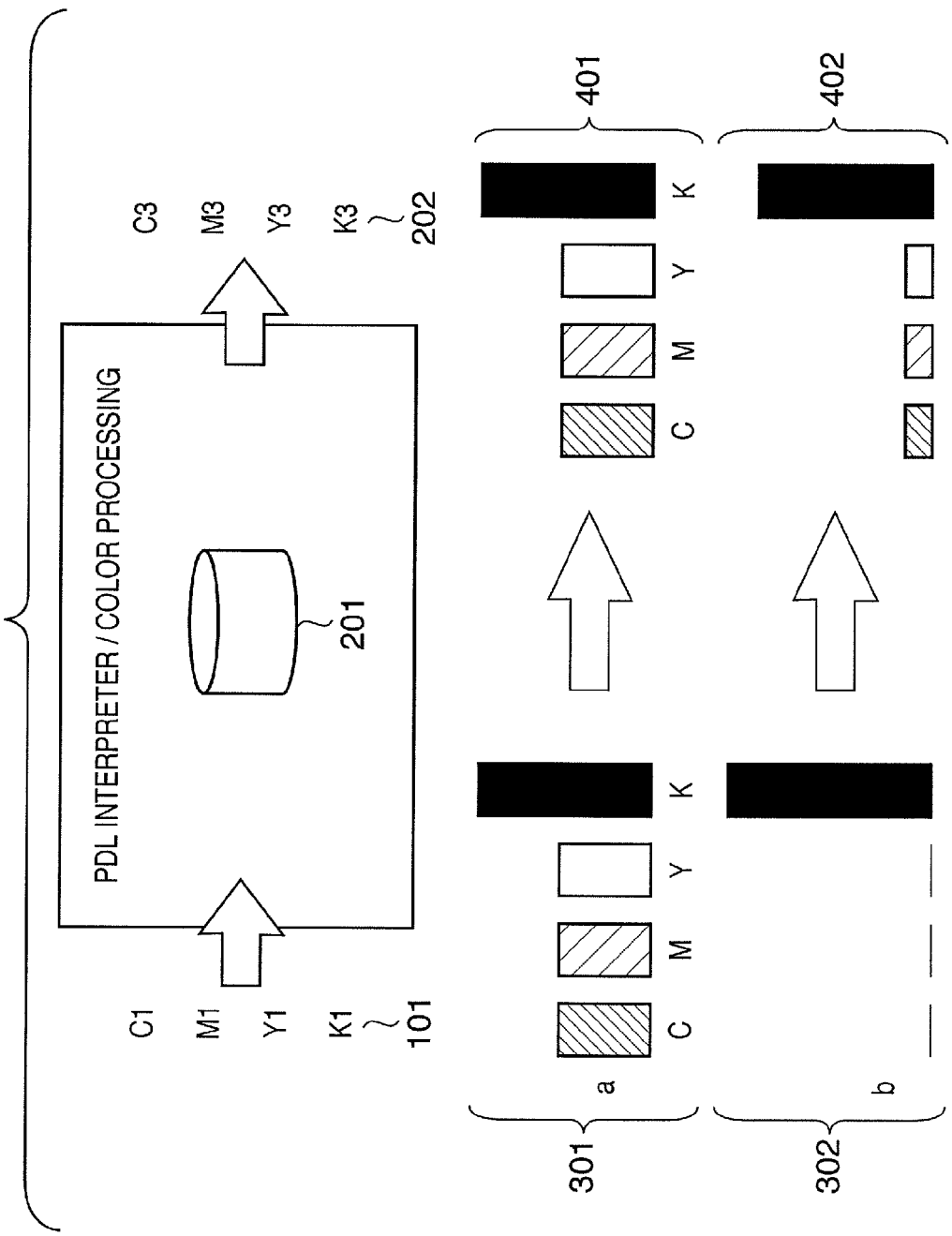
FIG. 4 is a diagram illustrating processing for converting input data to output data using a device-link profile.
Figure 5:
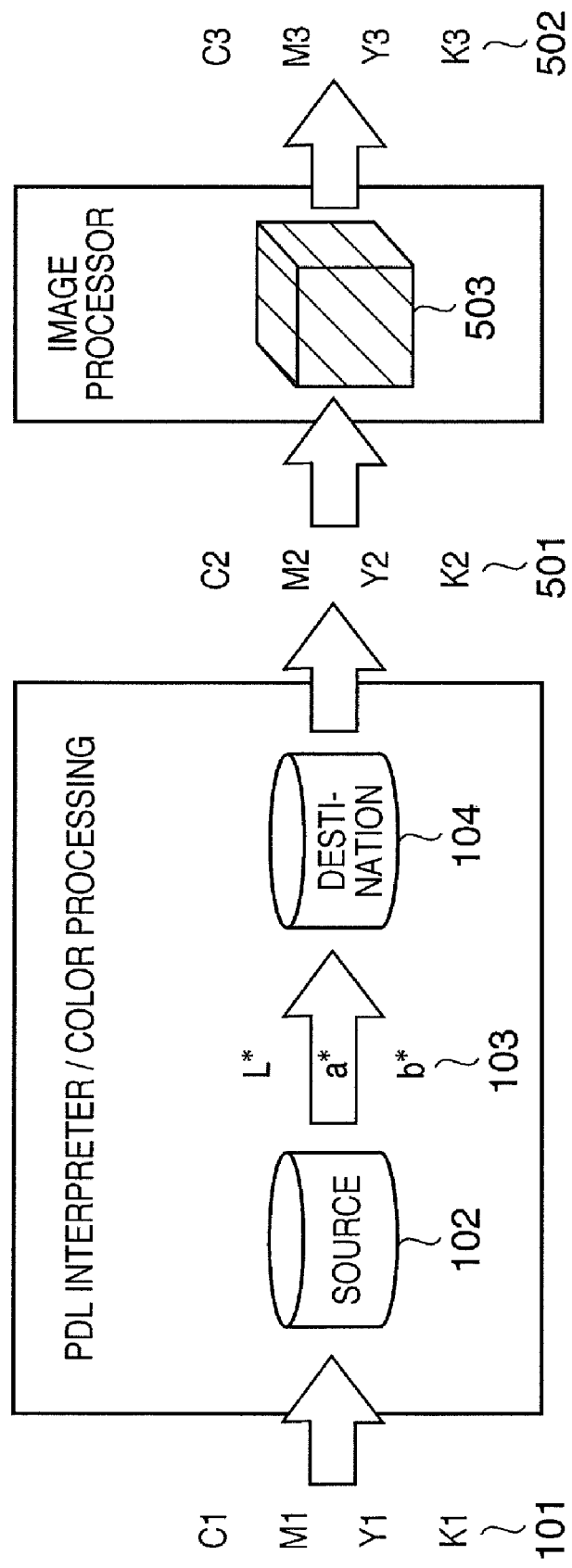
FIG. 5 is a diagram illustrating an arrangement for performing a calibration by a multi-dimensional LUT using an ordinary color profile.
Figure 6:
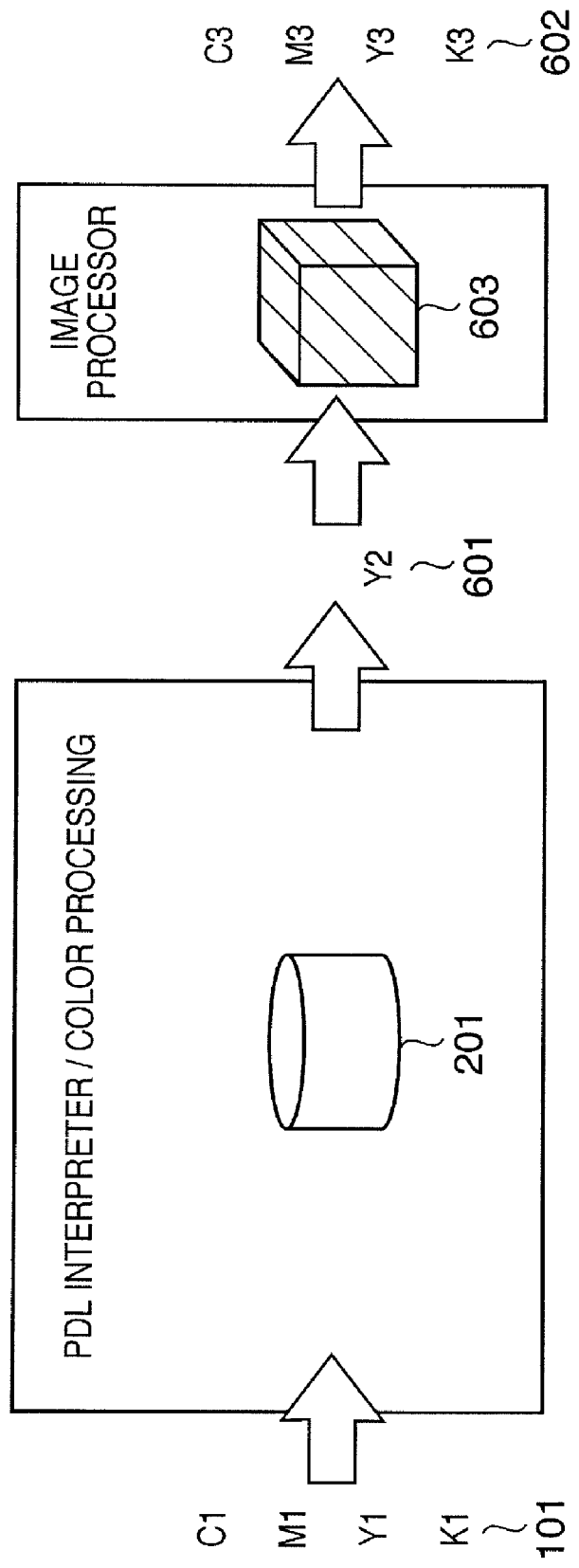
FIG. 6 is a diagram illustrating an arrangement for performing a calibration by a multi-dimensional LUT using a device-link profile.
Figure 7:
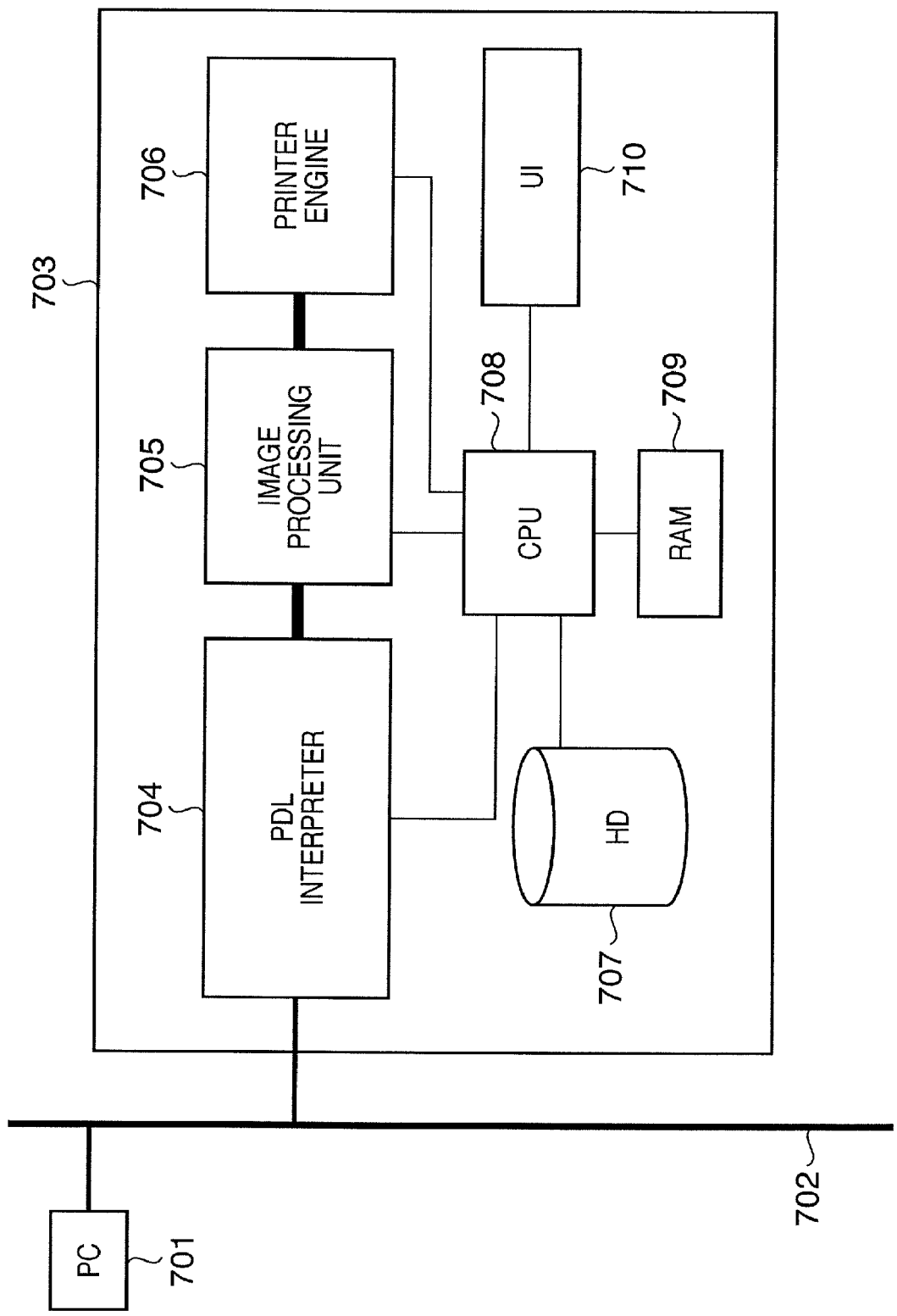
FIG. 7 is a diagram illustrating an example of the configuration of an image processing system according to a first embodiment of the present invention.

FIG. 7 is a diagram illustrating an example of the configuration of an image processing system according to a first embodiment of the present invention. As illustrated in FIG. 7, Page Description Language (PDL) data created by an application or printer driver within a personal computer (PC) 701 is sent to an image forming apparatus 703 via a network 702. A PDL interpreter 704 interprets commands described in the PDL of the sent PDL data and performs a color conversion using a color profile. The data obtained by the conversion is stored in a memory such as a RAM 709 or hard disk (HD) 707.

Next, image correction such as a calibration correction is performed on the data by an image processing unit 705 and the resultant data is sent to and printed by a printer engine 706. Further, it is so arranged that various settings such as a color profile can be specified by a user interface (UI) 710, and control of the instructions and of the various types of processing is carried out by a central processing unit (CPU) 708. Naturally, using the personal computer 701, the user may designate which of the combination of profile for inputs and profile for outputs and device-link profile is to be used, and the user may add such designation to the PDL.

Figure 8:
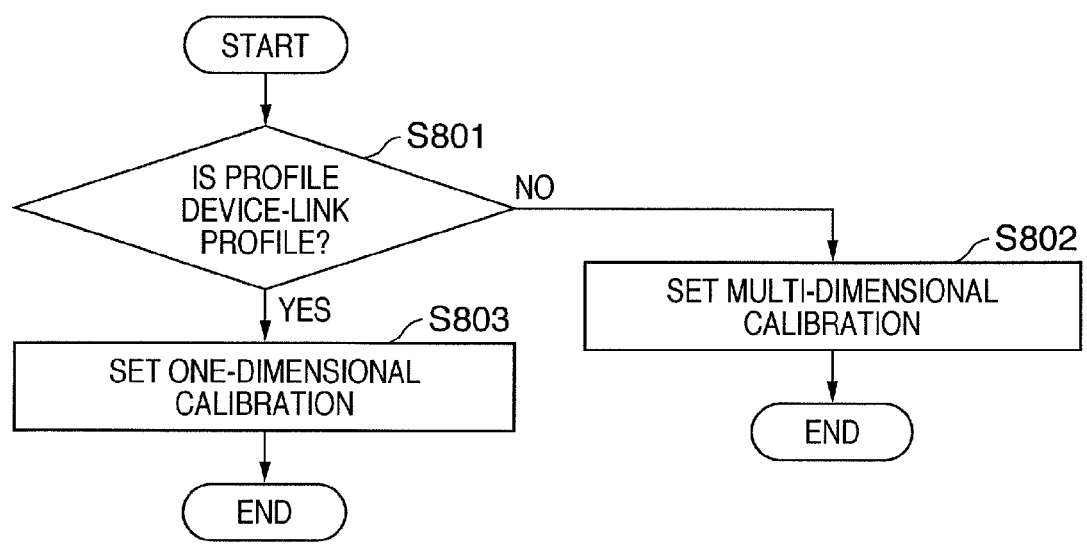
FIG. 8 is a flowchart illustrating calibration setting processing according to the first embodiment.

Next, reference will be had to FIG. 8 to describe processing whereby the CPU 708 sets a one-dimensional calibration or multi-dimensional calibration in accordance with whether color processing is by a color profile or device-link profile.

FIG. 8 is a flowchart illustrating calibration setting processing according to the first embodiment. First, at step S801, in accordance with the settings from the user interface 710 or personal computer 701, the CPU 708 determines whether a device-link profile is used in color processing in the PDL interpreter 704. If the result of the determination is that the device-link profile is not used, control proceeds to step S802, where calibration of the image processing unit 705 is set to multi-dimensional calibration.

When the setting of multi-dimensional calibration is made, a chart for creating a multi-dimensional calibration LUT is output and this output is read in by a densitometer, calorimeter or scanner (none of which are shown), whereby the multi-dimensional calibration LUT is generated. At the time of actual calibration, a change is made in such a manner that this multi-dimensional LUT is used. Further, in a case where only calibration of a one-dimensional LUT is performed before the change and a change to multi-dimensions is made for the first time, execution of calibration is prompted for and it is arranged such that the multi-dimensional calibration LUT is updated.

On the other hand, if it is determined at step S801 that the device-link profile is used, then control proceeds to step S803. Here the setting of one-dimensional calibration is carried out. Specifically, at the time of one-dimensional calibration, a chart for performing one-dimensional calibration is output and this output is read in by a densitometer, calorimeter or scanner (none of which are shown), whereby the one-dimensional calibration LUT is generated. At the time of actual calibration, a change is made in such a manner that this one-dimensional LUT is used. Further, in a case where only calibration by a multi-dimensional LUT is performed before the change and a change to one dimension is made for the first time, execution of calibration is prompted for and it is arranged such that the one-dimensional calibration LUT is updated.

In accordance with the first embodiment, when use is made of a device-link profile, calibration can be performed by causing the difference in CMYK input in the device-link profile to be reflected in the difference in CMYK of the output. By doing so, it is possible to prevent other colors from mixing in with data that has been converted to a single color.

Second Embodiment

A second embodiment according to the present invention will now be described in detail with reference to the drawings. The first embodiment merely selects the one-dimensional calibration method for storing CMYK values when the device-link profile is used. In the second embodiment, however, control is exercised in such a manner that the calibration can be selected.

The system configuration in the second embodiment is similar to that of the first embodiment described in conjunction with FIG. 7 and need not be described again.

Figure 9:
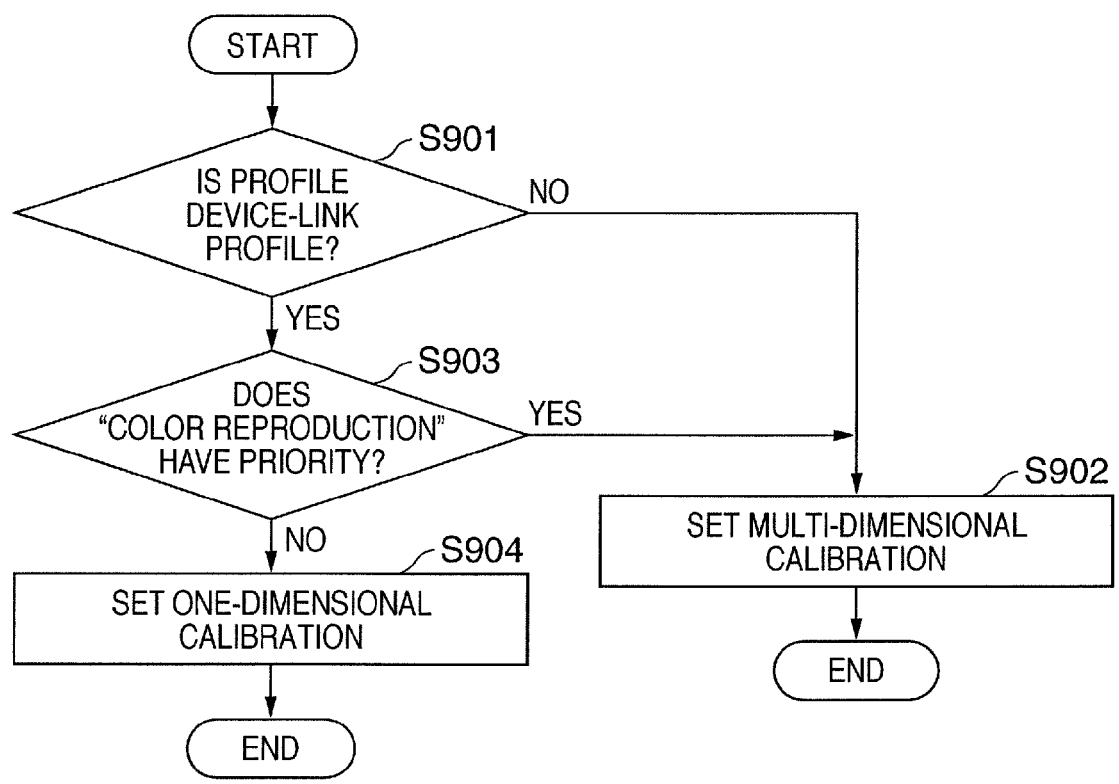
FIG. 9 is a flowchart illustrating calibration setting processing according to a second embodiment of the present invention.
Figure 10:
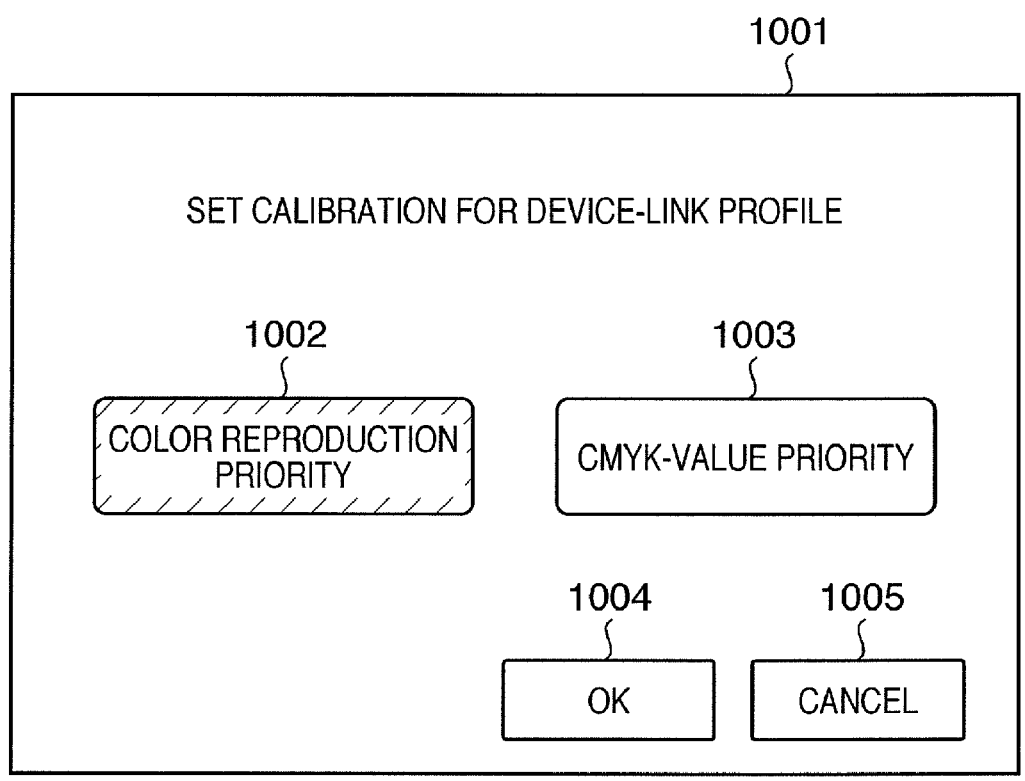
FIG. 10 is a diagram illustrating a screen, which is displayed on a user interface, for setting calibration for a device-link profile.

Reference will be made to FIGS. 9 and 10 to describe processing for changing over and setting one-dimensional calibration or multi-dimensional calibration in accordance with whether priority is given to "accuracy of color reproduction" or to "CMYK values (combination of output values)" in cases where the device-link profile is used.

FIG. 9 is a flowchart illustrating calibration setting processing according to the second embodiment. First, at step S901, the CPU 708 determines whether a device-link profile is used in color processing in the PDL interpreter 704. If the result of the determination is that the device-link profile is not used, control proceeds to step S902, where calibration of the image processing unit 705 is set to multi-dimensional calibration. The processing for this setting is similar to that of the first embodiment and need not be described again.

On the other hand, if it is determined in step S901 that the device-link profile is to be used, then control proceeds to step S903. Here a setting screen 1001 shown in FIG. 10 is displayed on the display unit of the user interface 710. The screen 1001 is for setting calibration for the device-link profile. The system waits for the user to use the screen 1001 to select either color reproduction priority 1002 or CMYK-value priority 1003. If the user selects tint priority 1002 and clicks an OK button, control proceeds to step S902 and the above-described processing for multi-dimensional calibration is executed.

If the user selects CMYK-value priority 1003, then control proceeds to step S904 and the setting of one-dimensional calibration is performed in a manner similar to that of the first embodiment.

It should be noted that the setting screen 1001 is displayed on the user interface 710 in a case where the setting of the profile has been performed by the user interface 710.

In a case where the setting of the profile has been performed using the user interface of the personal computer 701, the setting screen 1001 is displayed on the user interface of the personal computer 701 when the profile is set.

Thus, the second embodiment is such that if the device-link profile is used, it is possible to select whether to seek accuracy of color reproduction or a combination of output values. This makes it possible to increase the degree of freedom of the user.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is also attained by supplying a recording medium containing the program code of software capable of performing the functions of the foregoing embodiments to a system or an apparatus, reading the program code with a computer (e.g., a CPU or MPU) of the system or apparatus from the recording medium, and then executing the program code.

In this case, the program code read from the recording medium implements the novel functions of the embodiments and the recording medium storing the program code constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program code read by a computer, it goes without saying that the present invention covers a case in which an operating system or the like running on the computer performs a part of or the entire process based upon the designation of program code and implements the functions according to the embodiments.

Furthermore, program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the designation of the program code, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207164, filed Jul. 28, 2006, which is hereby incorporated by reference herein in its entirety.

What is claimed is:

1. An image processing apparatus comprising:
    a determination unit that analyzes input data to determine whether or not a device-link profile is used as a color profile for a color conversion process of the input data;
    a first setting unit that, if it is determined by the determination unit that the device-link profile is used, performs a first color conversion process to the input data using the device-link profile, to set a one-dimensional look-up table used for a one-dimensional calibration;
    a first image correction unit that performs the one-dimensional calibration to data converted by the first color conversion process using the one-dimensional look-up table set by the first setting unit, to execute image correction of the data converted by the first color conversion process;
    a second setting unit that, if it is determined by the determination unit that the device-link profile is not used, performs a second color conversion process to the input data using a source profile and a destination profile, to set a multi-dimensional look-up table used for a multi-dimensional calibration; and
    a second image correction unit that performs the multi-dimensional calibration to data converted by the second color conversion process using the multi-dimensional look-up table set by the second setting unit, to execute image correction of the data converted by the second color conversion process.

2. The apparatus according to claim 1, further comprising a selection unit that allows a user to select whether to execute the first processing flow or the second processing flow.

3. An image processing method comprising:
    a determination step of analyzing input data to determine whether or not a device-link profile is used as a color profile for a color conversion process of the input data;
    a first setting step of, if it is determined in the determination step that the device-link profile is used, performing a first color conversion process to the input data using the device-link profile, to set a one-dimensional look-up table used for a one-dimensional calibration;
    a first image correction step of performing the one-dimensional calibration to data converted by the first color conversion process using the one-dimensional look-up table set in the first setting step, to execute image correction of the data converted by the first color conversion process;
    a second setting step of, if it is determined in the determination step that the device-link profile is not used, performing a second color conversion process to the input data using a source profile and a destination profile, to set a multi-dimensional look-up table used for a multi-dimensional calibration; and
    a second image correction step of performing the multi-dimensional calibration to data converted by the second color conversion process using the multi-dimensional look-up table set in the second setting step, to execute image correction of the data converted by the second color conversion process.

4. The method according to claim 3, further comprising a selection step of allowing a user to select whether to execute the first processing flow or the second processing flow.

* * * * *